Figure 1:
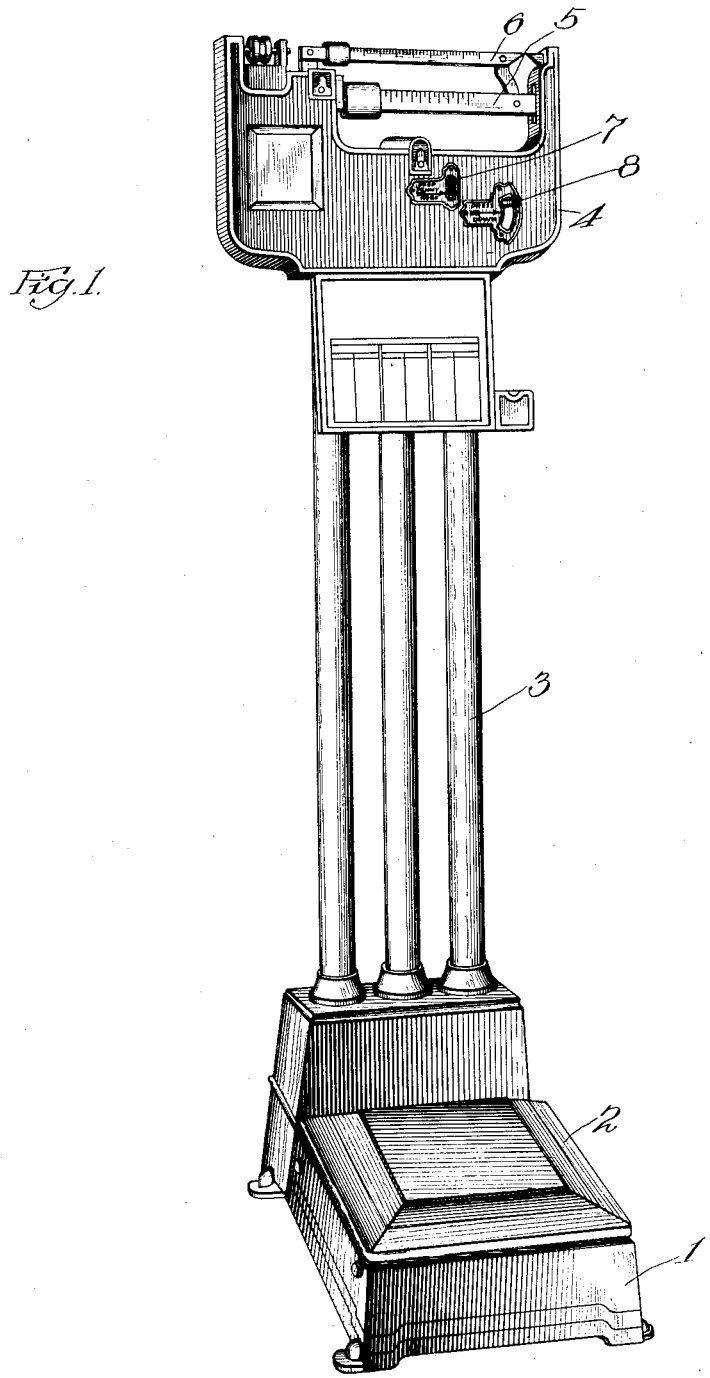

J. PAUPA & G. F. HOCHRIEM.
WEIGHING MECHANISM.
APPLICATION FILED AUG. 6, 1914.
1,143,224.
Patented June 15, 1915.
3 SHEETS—SHEET 2.
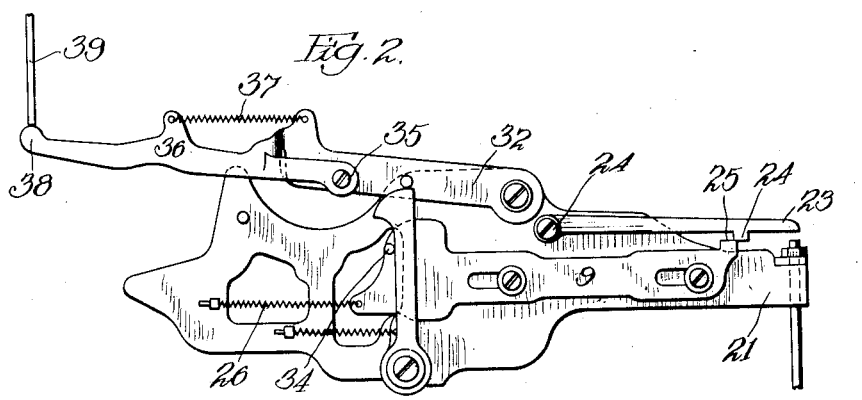
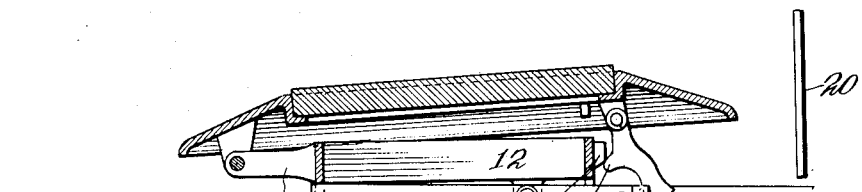
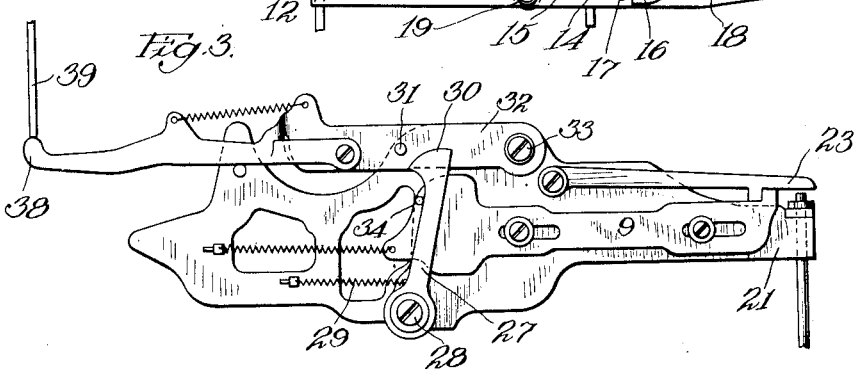
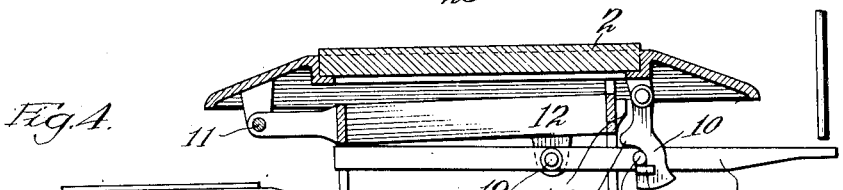
Witnesses:
Leo J. DuMais.
Arthur B. Framke
Inventors
Joseph Paupa
Gustav F. Hochriem
By Robt. Klotz & E. R. Goldsmith Attys.

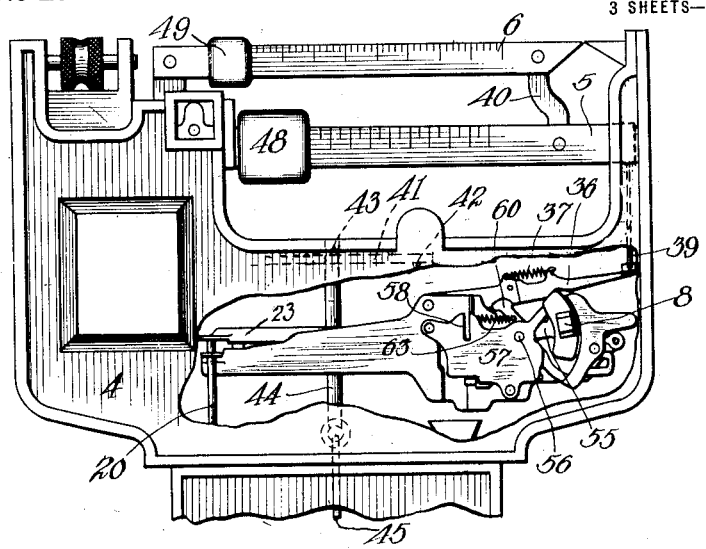
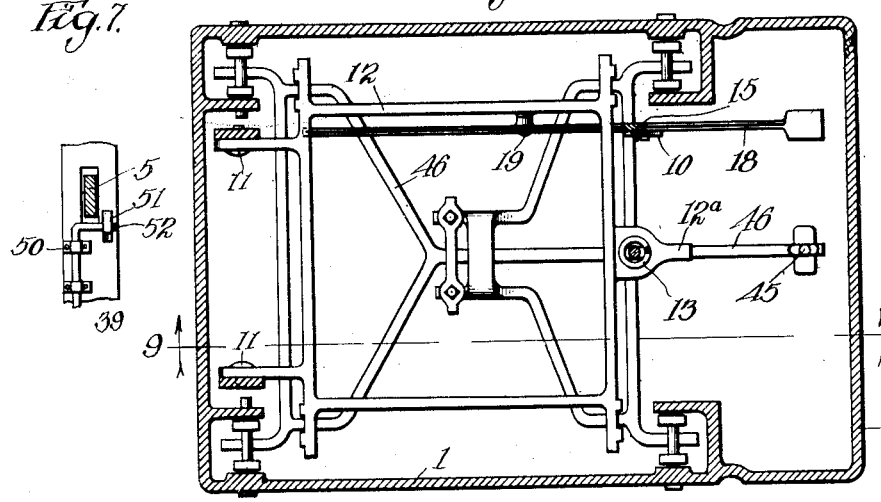
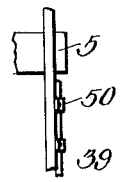
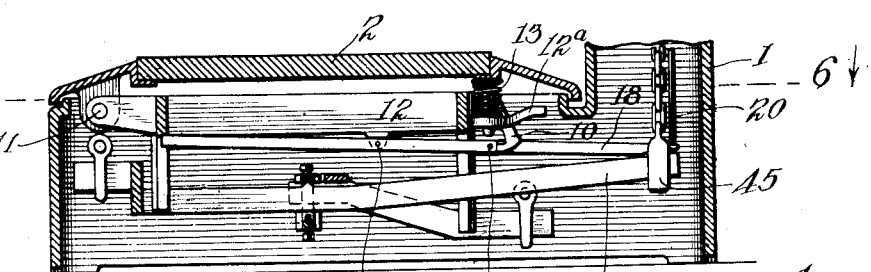

UNITED STATES PATENT OFFICE.

JOSEPH PAUPA AND GUSTAV F. HOCHRIEM, OF CHICAGO, ILLINOIS.

WEIGHING MECHANISM.

1,143,224.   Specification of Letters Patent.   Patented June 15, 1915.

Application filed August 6, 1914. Serial No. 855,364.

*To all whom it may concern:*

Be it known that we, JOSEPH PAUPA and GUSTAV F. HOCHRIEM, citizens of the United States, residing at Chicago, in the county of Cook and State of Illinois, have invented certain new and useful Improvements in Weighing Mechanisms, of which the following is a specification.

The essential object of this invention is to provide certain improvements adapted for use in connection with scales or weighing apparatus of that class in which a graduated beam carries weights which are adjusted by hand in order to ascertain the weight of the person or thing upon the platform, and which beam remains normally locked until a coin is inserted in a place provided for the purpose. Upon the insertion of the coin, the beam is released and the scale becomes operative, but when the person who has deposited the coin steps off the platform, the beam is again automatically locked and remains locked until released by the insertion of another coin.

The invention embodies certain improvements over the structures described in the two patents granted to us on November 5, 1912, No. 1,043,352, and No. 1,043,353.

In the apparatus shown in said two prior patents, as well as in many other weighing-mechanisms of the same class, the accuracy of the weighing operation is interfered with by the fact that permanent connections are provided between the platform and the devices which lock the weighing beam. The various parts which engage and guide the beam-locking means are adapted to produce friction and thus render the scale inaccurate.

The improvements forming the subject-matter of this application are intended to avoid this disadvantage and the beam-locking means embodies a vertical rod which is disconnected from the platform and which, together with its connections, remains normally inoperative. When the person who has been weighed, however, steps off the platform, means are provided which cause the beam-locking dog to be actuated and the weighing beam to be locked.

In the drawings, Figure 1 is a perspective view of a scale equipped with the herein described improvement; Fig. 2 shows in its upper half a front elevation and in its lower half a side elevation, partly in section, the movable parts being ready for weighing or for adjusting whenever the coin-controlled slide is actuated to release the devices which lock the weighing beam; Fig. 3 is a view similar to Fig. 2 showing the parts in the positions as respectively assumed by them while the person standing upon the platform is being weighed; Fig. 4 is a fragmentary detail view of the platform and the platform frame looking from the right of Fig. 1; Fig. 5 is a front elevation of the head of the scale showing the weighing beam and some of the connections therefor, the casing being broken away so as to expose the coin-handling mechanism; Fig. 6 is a section on the line 6—6, Fig. 9, showing some of the connections which extend from the platform to the weighing beam and which translate the depression of the platform into movement of the beam; Figs. 7 and 8 are fragmentary views at right angles to each other of the devices which lock the weighing beam in place, which locking means are adapted to be released by the proper manipulations of a coin; and Fig. 9 is a section on the line 9—9, Fig. 6.

The scale is supported upon a base 1 which rests upon the floor and supports the platform 2 upon which the person to be weighed stands. Upright members 3 extend to the casing 4 and the graduated beams 5 and 6 are retained upon or within the casing 4. These beams are normally locked and if a person steps upon the platform 2 his weight cannot be obtained, but upon depositing a coin in the slot 7 and depressing the lever 8, a coin-controlled slide 9 is released, thus permitting the beams 5 and 6 to rock, for the slide 9 releases the dog which normally locks the beams in place.

Beneath the platform 2 is a catch 10 which is pivoted to the platform 2. Said platform is hinged at 11 to the platform frame 12 and one end of the platform is yieldingly supported by the helical spring or springs 13 interposed between platform 2 and the lugs 12ª which are secured to the frame 12. The catch 10 is provided with a projection 14 which is adapted to engage a coöperating projection 15 carried at one end of the platform frame 12. The catch 10 is, furthermore, provided with an ear or projection 16 which coöperates with a stud 17 carried upon the rocking lever 18, which lever is pivoted at 19 upon the platform frame 12.

A vertical rod 20 passes through one of the hollow posts 3 and is guided by the casing 21 which holds the coin-controlled slide 9. At its lower end said rod 20 is adapted to be engaged and raised by one end of the pivoted lever 18. At its upper end the rod 20 is adapted to engage and raise a catch 23, which catch is pivoted at 24 to the casing 21. The catch 23 is provided with a toe 24 which engages a corresponding toe 25 carried upon the slide 9, thus locking the slide in the position depicted in Fig. 3, and holding same against the contracting force of the helical spring 26 which tends to pull the slide normally toward the left, Figs. 2 and 3.

A lever 27 pivoted at 28 to the casing 21 is normally pulled toward the left by the helical spring 29. At its upper end said lever 28 is provided with a curved cam face 30 which is adapted to engage a stud 31 carried upon a lever 32, which lever 32 is pivoted at 33 to the casing member 21. The coin-controlled slide 9 carries a stud 34 which is adapted to engage the lever 27 whenever the coin-controlled slide 9 is forced toward the right. At 35 an arm 36 is pivoted to the lever 32 and the spring 37 yieldingly holds the members 32 and 36 (which form a jointed lever) in a predetermined relative position, the free end 38 of the member 36 being adapted to actuate the dog 39, which dog acts as the lock which locks or releases the weighing beams 5 and 6.

The beams 5 and 6 are secured together by a strap 40 and the yoke 41, which said yoke is adapted to be fulcrumed at 42 in the customary manner, not shown in detail in the drawings. Only a detail of the yoke 41 is shown, being depicted in dotted lines in Fig. 5. At 43 the member 41 is provided with a knife edge over which the loop-like end 44 of the connecting rod 45 fits. Said member 45 extends downwardly through one of the hollow columns 3 shown in Fig. 1, and at its lower end is connected to the weighing lever 46. Said member 46 is pivotally connected in an obvious manner to the frame 12 and the platform 2, and when a person steps upon the platform, his weight causes the right end, Fig. 6, of the weighing lever 46 to be depressed, which depression in turn causes a downward pull upon the connecting arm 45. Since said arm 45, by means of the loop 44, is in connection with the weighing beam at the left of the fulcrum 42, it follows that depression of the platform 2 will cause depression of the left end, Fig. 5, of the beam, and when the weights 48 and 49 are moved toward the right, Fig. 5, the beams are balanced and the weight of the person upon the platform 2 can be ascertained.

The locking dog 39 is L-shaped at its upper end (Fig. 7) and slides within straps or guides 50 and 51. When said locking dog 39 is in uppermost position, the finger 52 which extends at right angles to the main length of the locking dog 39 engages the under side of one part of the weighing beam and thus locks the beam against movement, in this manner preventing the use of the scale for weighing purposes until the dog 39 is released. The locking dog 39, as previously set forth, is adapted to be released upon proper manipulation of a coin, and the coin-handling-mechanism (which is the same as depicted in United States Patent No. 1,043,352) is conventionally shown in Fig. 5 of the drawings. Said coin-handling mechanism comprises a thumb-piece 8 which is attached to the arm 55 pivoted at 56 to the plate 57. Said plate 57 is notched at 58, which notch is in registration with a coin slot 7 in the exterior of the casing 4. The arm 60 is integral with the arm 55. When a coin is deposited in the slot 7, it passes by gravity through recess 58. The thumb-piece 8 is then forced downwardly, then released and permitted to return to initial position, being thus returned by means of the spring 63. When a coin is inserted, it falls to a point where it is intermediate the rotatable thumb-piece 8 and the slide 9, thus serving temporarily to lock said members together and permitting the rotary movement of the thumb-piece 8 to be translated into a left-to-right movement of the slide 9.

Whenever a man steps upon the platform 2, it is depressed, rocking upon its hinged connection or pivot 11. Thereupon the catch 10 moves to a point where the projection 14 is beneath the projection 15 upon the platform-frame 12 and where the ear 16 is beneath the stud 17 upon the lever 18, which lever remains clear of the upright rod 20. Upon the insertion of a coin and the movement of the thumb piece 8, the slide 9 is forced from left to right, Fig. 2, and the slide is adapted to be locked in the position of Fig. 3 by means of the coöperating toes 24 and 25. This left-to-right movement of the slide 9 causes the lever 27 to rotate in a clockwise direction and carries its end 30 out of engagement with the stud 31. This releases the members 32 and 36 and permits the locking dog 39 to drop to a position in which the beams 5 and 6 will be released. Thereupon the person who is standing upon the platform 2 may move the weights 48 and 49 upon the graduated beams and perform the weighing operation.

When the man who has been weighed steps off the platform, the spring 13 will raise the platform 2. The lever 18 is raised by means of the catch 10, the ear 16 will coöperate with the stud 17, and as the lever 18 is thus raised, its right end will raise the rod 20. The upper end of this rod 20 being moved upwardly will lift the right end of the pivoted arm 23, thus lifting the toe 24 clear of engagement with the coöperating toe 25 and permitting the spring 26 to retract the coin-controlled slide 9 and return same to the position of Fig. 2. As the slide 9 thus returns toward the left, the rocking lever 27 is released and its spring 29 carries the same toward the position of Fig. 2. The end 30 will ride under the stud 31 and this will in turn rock the jointed lever 32—36 upon the pivot 33 thus elevating the sliding dog 39 to the position of Fig. 7 and locking the beams.

After the rod 20 has been raised sufficiently to release the catch 23, the projection 14 which is carried upon the catch 10 will engage the projection 15 at one end of the frame 12. This engagement of the members 14 and 15 will cause the lower end of the pivoted catch 10 to swing toward the right, whereupon the ear 16 will ride out of engagement with the stud 17, as shown in Fig. 2, the right end of the lever 18 will drop, the rod 20 will be released, and the entire apparatus will be in position for a new weighing operation. If the platform is trod upon before a coin is introduced into the apparatus, the catch 23 will be raised but the jointed lever 32 and 36 will be unaffected and will remain unaffected until such time as the slide 9 is moved toward the right, and the slide 9 in turn cannot be moved until the coin-actuated mechanism comes into play. The vertical rod 20 is out of operative engagement with the lever 18 except at the instant when the load is removed from the platform. After a person has been weighed and steps off the platform, the catch 10 moves upwardly, momentarily hooks its projections 16 on the stud 17, and remains in such position until freed by the projection 14. This tilts the lever 18 on its pivots, elevates its end into engagement with the lower end of the vertical rod 20 which in turn raises and releases the catch 23 and permits the spring 26 to operate the slide 9 which controls the locking dog for the beams.

The rod 20 which connects the platform to that mechanism shown in Figs. 2 and 3, passes through one of the columns 3, preferably that column at the left side of Fig. 1. The member 45 which connects the platform to the beams 5 and 6, passes through the middle column and the right hand column conducts the coins from the casing 4 to a suitable receptacle adjacent the platform 2.

We claim as our invention:

1. A weighing machine comprising a frame having a vertical extension, a platform movably mounted in said frame, a weighing beam in the vertical extension of said frame above said platform, a vertical actuating rod entirely disconnected from all moving parts of the machine, locking means for the weighing beam, means for releasing said locking means, means for retaining said locking means in releasing position, a lever adapted to engage and move said rod to release said retaining means, a catch pivoted to the platform and constructed and arranged to momentarily engage and move said lever as the platform raises upon removal of its load, and means for elevating said platform when its load is removed.

2. A weighing machine comprising a frame having a vertical extension, a platform immovably mounted in said frame, a weighing beam in the vertical extension of said frame above said platform, connections between the weighing beam and platform, a vertical actuating rod entirely disconnected from all moving parts of the machine, locking means for said weighing beam, coin-controlled releasing means for said locking means, means for retaining said locking means in releasing position, a lever adapted to engage and move said rod to free said retaining means, a catch pivoted to the platform and constructed and arranged to momentarily engage and move said lever as the platform raises upon removal of its load, and spring means for elevating said platform when its load is removed.

3. A weighing machine comprising a frame having a vertical extension, a platform movably mounted in said frame, a weighing beam in the vertical extension of said frame above said platform, connections between the weighing beam and platform, a vertical actuating rod entirely disconnected from all moving parts of the machine, locking mechanism for the weighing beam, coin-controlled means for releasing said locking mechanism, means for retaining said locking mechanism in releasing position, a lever adapted to engage and operate said rod to release said retaining means, a catch pivotally depending from the platform and constructed and arranged to momentarily engage and move said lever as the platform rises upon removal of its load, and means for elevating said platform when its load is removed.

4. A weighing machine comprising a frame having a vertical extension, a platform movably mounted in said frame, spring means for pressing said platform upwardly, a weighing beam in the vertical extension of said frame above said platform, connections between the weighing beam and platform, a vertical actuating rod entirely disconnected from all moving parts of the machine, locking mechanism for the weighing beam, a coin-controlled slide for releasing said locking means, a dog for retaining said locking means in releasing position, a lever adapted to engage and move said rod to release said retaining dog, and a catch pivoted to the platform and constructed and arranged to momentarily engage and move said lever as the platform raises upon removal of its load.

5. A weighing machine comprising a frame having a vertical extension, a platform movably mounted in said frame, spring means for pressing said platform upwardly, a weighing beam in the vertical extension of said frame above said platform, connections between the weighing beam and platform, a vertical actuating rod entirely disconnected from all moving parts of the machine, locking mechanism for the weighing beam, spring means for normally maintaining and returning said locking means to its locked position, a coin-controlled slide for releasing said locking means, a dog for retaining said locking means in releasing position, a lever adapted to engage and move said rod to release said retaining dog, and a catch pivoted to the platform and constructed and arranged to momentarily engage and move said lever as the platform raises upon removal of its load.

6. In a weighing apparatus, a platform frame, a platform mounted in said platform frame, means for normally pressing said platform upwardly, said platform being adapted to be depressed by suitable weight placed thereon, a weighing beam, operative connections between the beam and platform, means for locking said beam against movement, means for releasing said locking means and retaining it in releasing position, and means actuated by upward movement of the platform from a depressed position for freeing said retaining means and thereby permitting the locking of said beam including a vertical rod, a catch carried by the platform, and a lever, said rod being entirely disconnected from the moving parts of the machine and being adapted to be moved by momentary engagement of the catch with the lever as the load is removed from the platform.

7. In a weighing mechanism a platform frame, a platform mounted in said platform frame, means for pressing said platform upwardly, a weighing beam, operative connections between said weighing beam and platform, means for locking said weighing beam against movement, means for releasing said locking means and retaining it in releasing position, a vertical rod entirely disconnected from the moving parts of the machine and adapted to be moved by the raising of the platform as the load is removed therefrom to release the retaining means and permit the locking of the beam, a lever adapted to engage and move said rod and a catch depending from the platform and adapted to momentarily engage and move said lever as the platform raises upon removal of its load.

In testimony whereof we hereunto affix our signatures in the presence of two witnesses.

JOSEPH PAUPA.
GUSTAV F. HOCHRIEM.

Witnesses:
 ROBT. KLOTZ,
 CARL MILLER.